Dec. 11, 1962  H. MUTH  3,068,473

SYSTEM FOR SUPERVISION OF VEHICLES

Filed Nov. 3, 1959  3 Sheets-Sheet 1

Inventor:
Herbert Muth
By *[signature]*
Patent Agent

Inventor:
Herbert Muth
By
Patent Agent

Inventor:
Herbert Muth

United States Patent Office 3,068,473
Patented Dec. 11, 1962

3,068,473
SYSTEM FOR SUPERVISION OF VEHICLES
Herbert Muth, Offenhausen, Germany, assignor to Telefunken G.m.b.H., Berlin, Germany
Filed Nov. 3, 1959, Ser. No. 850,708
Claims priority, application Germany Nov. 6, 1958
18 Claims. (Cl. 343—112)

The present invention relates to a system at a central station for continuously locating a plurality of vehicles.

More particularly, the invention relates to an air traffic control system, although it is not limited to this application, i.e., it can be generally used to control all kinds of vehicles, including ships, motor cars, etc.

Air traffic control is very important, because it is necessary to ascertain the locations of planes in the air space.

It has been known to supervise the air space by means of a panoramic radar apparatus or plan position indicator on the screen of which the air space with the individual airplanes is represented. In radar apparatus, it happens that, sometimes, particular airplanes are not indicated, because the reflection properties of the airplanes are changing to a great extent and, because nulls occur in the vertical pattern of the directional radar beam. In addition to this, the airplanes appear on the screen only as light points so that the observer of the screen does not know which plane corresponds with which light point. It has been known to correlate the airplane to the individual light point by providing in the airplane a so-called transponder which returns coded signals to the radar apparatus as soon as the airplane is illuminated by a radar apparatus, and which can then be used in the indicator apparatus to designate the corresponding light point. However, such transponders are expensive and do not operate entirely reliably.

Therefore, it is an object of the present invention to provide a system for the continuous location of a plurality of vehicles, the system functioning to locate and identify a very large number of vehicles within the shortest time, and continuously, wherein the identification of the vehicles is simultaneously presented, and wherein only a single frequency is required for obtaining the above data.

This new system is far superior to known radar location systems, particularly with respect to its sensitivity and range, because in case of radar measuring of energy reflected from the targets, the returned echo is only in the magnitude of a few milliwatts, while in the system according to the invention, in which the vehicles themselves transmit, the energy radiated from the vehicles is in the order of a few watts.

It is another object of the invention to provide a transmitter in each of the vehicles to be controlled, and receiver means in the central station, said transmitters and receiver means being operated at the same frequency. The system provides a time standard, i.e., a precision clock, to control the transmitter in each vehicle, to analyze with respect to time the signals received in the central station, and to start the vehicle transmitters to transmit a signal at the time instant assigned in each case and predetermined by the time standard. The system selects the intervals within the transmission time sequentially in such a manner, that the signal of a transmitting vehicle is received in the receiver at the assigned instant and prior to the signal of the vehicle transmitting subsequently.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
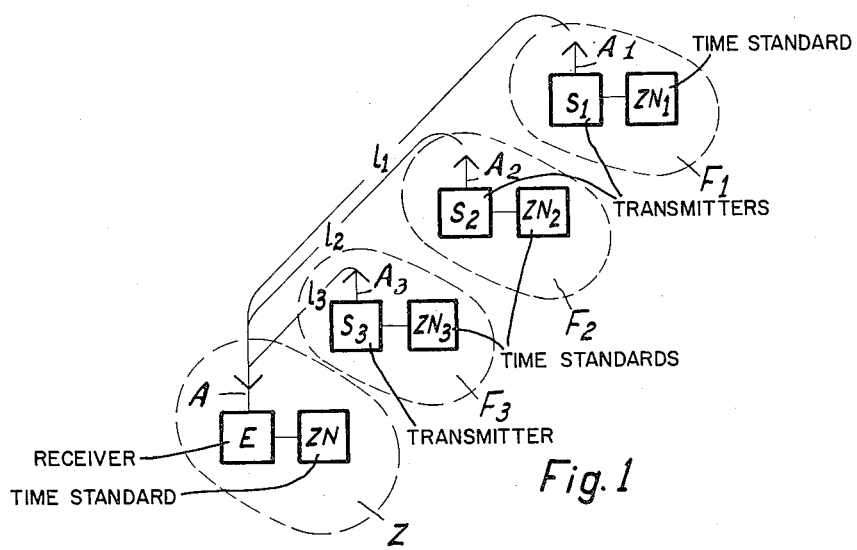
FIGURE 1 illustrates in block diagram form a simple embodiment of the invention.

In the system of FIGURE 1, a central station Z is provided having a receiver E connected to a receiving antenna A. A time standard ZN is assigned to the receiver E. A plurality of vehicles, for the sake of simplicity illustrated only as three, namely, $F_1$, $F_2$ and $F_3$, are to be supervised from the central station Z. Transmitters $S_1$, $S_2$ and $S_3$, each having a transmitting antenna $A_1$, $A_2$ and $A_3$, are provided in these vehicles, and time standards $ZN_1$, $ZN_2$ and $ZN_3$ are associated with the respective transmitters $S_1$, $S_2$ and $S_3$, and have time intervals similar to those of the time constant ZN at the receiver E in the central station Z. All of these vehicle transmitters and the receiver E in the central station Z are operated at the same frequency. Each of the vehicles has a certain transmitting time-slot. The energization of the vehicle transmitters during the time-slots assigned thereto is controlled by the time standard. The transmitting time-slots of the individual vehicles and the intervals therebetween are assigned in such a manner, that the signals transmitted by one vehicle will arrive at the receiver E of the central station Z prior to the signals of other vehicles transmitting in sequence. A definite identification of the vehicle from which the signal originates is made by noting the instant at which a signal is received in the central station if the transmitting time-slot for each individual vehicle is fixed according to a prearranged time-sharing program and is known in the central station.

Figure 2:
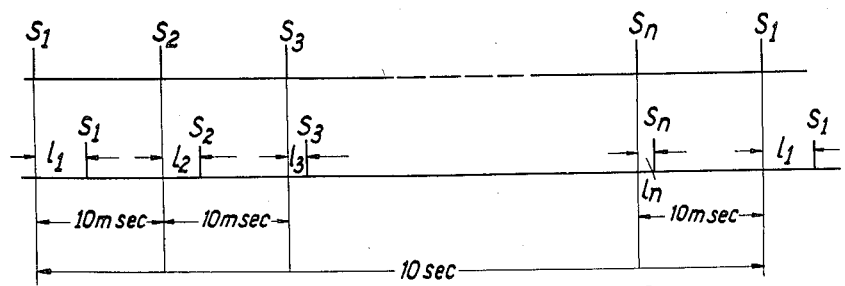
FIGURE 2 shows graphically the pulses as used in the system according to FIGURE 1, arranged on a time-slot program.

Since the transit time required for a signal to travel from the vehicle to the central station is proportional to the distance of said vehicle therefrom, this transit time can be used for ascertaining the vehicle range if the transmitting signals of the vehicles are transmitted at exact times. For example, it is assumed, according to FIGURE 2, that each of the vehicles transmits an identifying pulse at the start of the time-slot assigned thereto. The identifying pulses in FIGURE 2 are denoted by $s_1$, $s_2$ $s_3$ . . . $s_n$. These pulses always arrive in the central station after a delay caused by the transit times $L_1$, $L_2$, $L_3$ . . . $L_n$. The distance of a vehicle from the central station can be ascertained by the time interval L. The phase delays in the apparatus are also included in the distance measurements. Therefore, it is necessary to subtract the delays of the apparatus from the measured transit times to ascertain the distances. The transit time variations for the signal transmissions should be as small as possible, so that it is recommended to use carrier frequencies which are not subjected to reflections in the ionosphere, i.e., suitable carrier frequencies in the ultra short-wave range. The pulse wave-form shown in FIGURE 2 has been simplified for the sake of schematic illustration. The distance-measuring system, as described with reference to FIGURES 1 and 2, has little utility in the case of arbitrary distribution of the vehicles. However, this distance-measuring system can be used for locating if all of the vehicles are moving along a certain route or along a certain lane given by a guiding beam. The measuring test then indicates simultaneously the location of the vehicles.

The time-slots for the transmission of signals and the arrival of signals has to be exactly ascertained for the precise measuring of distance. Time standards, i.e., precision clocks, are necessary for such time measuring. Quartz oscillators may be provided as time standards, and oscillators having an accuracy of $\pm 1 \times 10^{-8}$ have been known. Such precision means that, over a period of one day of about 100,000 seconds, a quartz clock has an error of a maximum of 1 millisecond.

In case of distance measuring, a time error of 1 millisecond results in a distance error indication of 300 kilometers. Such error is too large for the useful locating of a target. Therefore, the precision of the time standard has to be increased, for example, to $\pm 1 \times 10^{-10}$, whereby a precision of about $\pm 10$ microseconds per day is obtained. With such precision, the distance measurements would be exact to $\pm 3$ kilometers. Such precision would be sufficient in most cases. It is presumed that in the future quartz clocks in association with atomic clocks will be built having still higher precision in determining time, for example, $\pm 1 \times 10^{-11}$, whereby a location can be ascertained with a precision of $\pm 0.3$ kilometer. The guaranteed precision in quartz clocks is valid for long time intervals, for example, several months, during which aging has been allowed for. However, within a single day, aging does not occur to a noticeable extent, so that a quartz clock, the precision of which amounts over a longer time interval to $\pm 1 \times 10^{-8}$, has in a single day a precision which lies about two orders higher.

Figure 3:
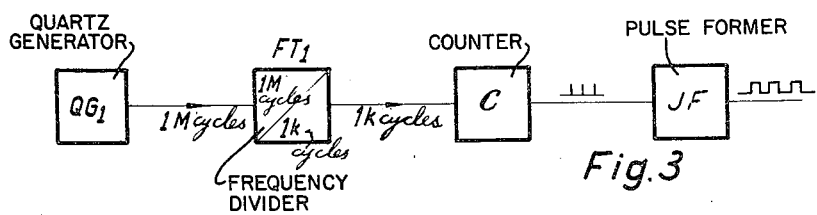
FIGURE 3 shows in block diagram form a quartz-crystal time standard.

An example of a quartz clock is illustrated in FIGURE 3, which can be used as a time standard for a vehicle and as time standard in the central receiver. This time standard comprises a quartz generator $QG_1$, which uses, for example, an upper harmonic crystal and gives a frequency of one megacycle. This frequency is divided in a frequency divider $FT_1$ by the factor of one thousand, so that a frequency of one kilocycle is obtained at the output of the frequency divider. This oscillation is fed to a counter C, converting the sine oscillation into pulses, counting the number of pulses and transmitting an output pulse after a certain number of input pulses.

It is assumed that the counter C transmits a pulse on each 10,000 cycle fed to the input, i.e., a pulse every ten seconds. This output pulse of the counter C is converted in a pulse former JF into a form suitable for triggering the vehicle transmitter at the assigned time-slot instant T. With the described time standard in the receiver, there is obtained from the output pulse of the pulse former JF a reference pulse so that distance can be measured by measuring the spacing between the reference pulse and the vehicle identifying pulse received shortly thereafter.

Quartz time standards of the described type can be manufactured relatively simply and occupy only a small space. A quartz time standard having a time precision of $\pm 1 \times 10^{-8}$ over longer time intervals occupies a space of only about one cubic decimeter. In the foregoing, it was mentioned that time standards can be used wherein the precision for longer time intervals is substantially lower than that actually required if the time standards are synchronized more often, for example, each day. In case of an air traffic supervision system, this can be realized, for example, by synchronizing at each airport which generally will have a central station with a receiver and a time standard, to which the airplane time standard can be synchronized prior to take off. During the relatively short duration of the flights, amounting usually only to a few hours, a high precision of the time standard can be maintained which is substantially above the precision expected over longer time intervals. Preferably, there will be provided in the central stations time standards of still high precision, for example, atomic clocks or quartz time standards synchronized by atomic clocks. In case of several central stations, it is also necessary that the time standards of the individual central stations by synchronized with one another. The synchronization between the time standards of these various central stations cannot be carried out over a radio link, due to the required high precision, because transit time variations have to be taken into account in case of radio transmission. However, it is possible to provide synchronization via a cable connection or via a directional radio link in optical view, wherein the transit time of the directional radio path is known. If such communication links are not present, it is possible to synchronize by means of a comparison standard, said comparison standard being brought to the individual central station several times a year and being compared there with the local time standards.

The following numerical examples will illustrate the possibilities of the system according to the invention. It is assumed that the time standards operate at a maximum error of $\pm 1 \times 10^{-11}$, i.e., the time standard during a single day may have an error by $\pm 1$ microsecond. In the case of distance measuring, the transit time of 1 microsecond corresponds to a distance of 0.3 kilometer, so that the results of the distance tests may be incorrect by 0.3 kilometer. It is assumed that to each of the vehicles always ten milliseconds are assigned as the transmitting time-slot. With such time-slots for successive transmissions, it is assured that the signals of one vehicle cannot fall into the time-slot of another vehicle transmitting, for example, during the succeeding 10 milliseconds. If it is furtheir assumed sufficent that information be received from a certain vehicle every ten seconds, then one thousand vehicles can be served with one frequency.

It has been assumed in the foregoing that the vehicles transmit signals at periodic time-slots. Although this is preferable, it is not absolutely necessary.

Figures 4, 5:
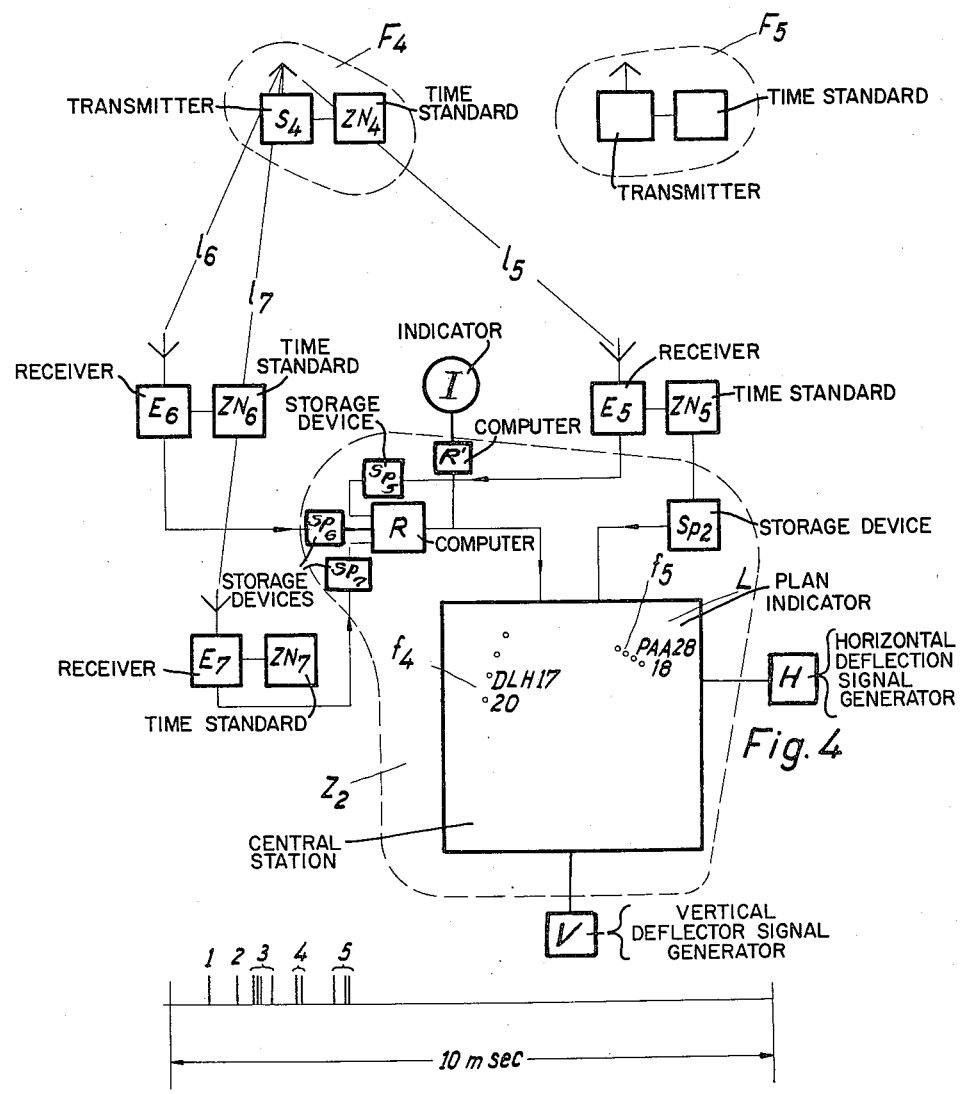
FIGURE 4 shows in block diagram form a further embodiment of the invention, wherein azimuth location is also possible.
FIGURE 5 is a graphical indication of transmission signals transmitted from vehicles shown in FIGURE 4.

According to a further development of the inventive system, it is possible to identify and to ascertain the positions of the vehicles in case of any distribution. This system is shown in FIGURE 4, wherein in place of the individual receivers in the central station, several receivers which are separated from one another, i.e., three in the present example, are provided, since with at least three receivers, a definite location of vehicles in space in any distribution is possible. For the sake of simplicity, only two vehicles $F_4$ and $F_5$ are shown, the transmitting equipment of which corresponds to that of the vehicles $F_1$, $F_2$ and $F_3$, shown in FIGURE 1. Also, the transmitting times of the individual vehicles may be distributed similarly as described with reference to the diagram of FIGURE 2. Three receivers $E_5$, $E_6$ and $E_7$ in FIGURE 4 receive within a certain time-slot one signal from a vehicle, for example, the vehicle $F_4$. The signal spacing from the reference time fixed by the time standard $ZN_5$, $ZN_6$, $ZN_7$ gives the transit times $L_5$, $L_6$, $L_7$ of the signals. In the present example, it is assumed that one time standard is provided in each of the receivers, so that the transit times to the vehicles can be directly ascertained in the individual receiver stations. It is also possible to measure the transit time in the central station itself, with which the receiver station may be connected, for example, via cable or a directional radio link, if the transit times via the cables or directional radio links are subtracted from the measured transit time.

The distance measurements from the receivers $E_5$ to $E_7$ are fed with suitable coding to a computer R in the central station $Z_2$. The transit times 1, for example, in microseconds, may be fed as codes to the computer which calculates from the three distance values and the location of the receivers $E_5$ to $E_7$ the locations of the individual vehicles in rectangular or polar coordinates.

In order to obtain a clear presentation of the locations of all of the vehicles, these locations will be illustrated on a map-like plan indicator L. Such indication can be presented on the screen of a cathode ray tube. In place of a presentation of the screen of a cathode ray tube, other presentations are possible, for example, the locations can be indicated by optically projecting them on a surface, or mechanically.

In the case of a cathode ray tube, the electron beam may be deflected in rectangular (by deflection signals generated in devices H and V) or in polar coordinates and the electron beam deflection used can be that of conventional television techniques. In this presentation, the computer R can designate locations by giving the number of that raster line on which the location is situated, and then the value for ascertaining the location of the dot on the line.

Furthermore, it is possible to design the computer in such a manner that it produces and designates a particular number which corresponds to a particular picture point in the raster for the presentation of the location of the vehicle. The number of the raster line of the particular picture point, that point corresponding to the number produced by the computer, is determined by the next higher integral multiple of the certain number of picture points each line consists of, with reference to the number of the picture point selected. The picture point location on that particular line is given by the difference between the number of the particular picture point and the next lower integral multiple of the number of picture points of each line, that difference determining the distance of the selected point from the line start at which the location is illustrated as a point of light by the electron beam.

If a picture is written during the time corresponding to the time interval between successive transmitting times of two vehicles transmitting according to a time-slot program, for example, within ten milliseconds, the location of one vehicle is illustrated with each picture recorded. In order to see all of the vehicles, a long-persistency picture screen is used.

In some instances, it may be necessary to temporarily store the indication of the locations of the vehicles in storage-devices $Sp_5$, $Sp_6$, $Sp_7$ as they are ascertained in the computer for the abovementioned optical or mechanical methods which, likewise, can be applied to obtain a map-like presentation of the locations of the vehicles.

It is also useful to store on the plan indicator the locations of a vehicle by a plurality of successive location measurements which may be obtained, for example, every ten seconds whereby, in case of a presentation on the screen of a cathode ray tube, a picture screen with a suitably long persistency is employed. The presentation of the vehicles then appears as shown in FIGURE 4 at $f_4$ and $f_5$. The direction of the dotted chains on the indicator L results in curves representing the paths of vehicles and the distances between the individual dots serve to indicate the velocities of the vehicles. Differences in the velocity of the vehicles can be derived from the lengths of the light-dotted chains.

As mentioned in the foregoing, with the knowledge of the time-slot instant of reception of a signal, there is obtained the identification of the vehicle, because certain transmission times are assigned to certain vehicles. The designations of the vehicles comprise, for example, letters and/or numbers. A register is provided in the receiver in which the transmission time of the vehicle is ascertained, whereby in the register the transmission time and the respective identifying letters and/or numbers of the vehicle are stored from which the characteristic letters and/or numbers can be derived at the transmission time.

This register denoted in FIGURE 4 by $Sp_2$ comprises a magnetic, electric or mechanical storage means furnishing automatically the characteristic letters and/or numbers if the transmission time of the vehicle is applied thereto.

In order to complete the plan indication, it is recommended to record, for example, in addition to the light points indicating the locations, the characteristic letters and/or numbers, for example, $DLH_{17}$ and $PAA_{28}$ according to FIGURE 4. In case of presentation of the vehicles on the screen of a cathode ray tube, this kind of data can be recorded in addition to the light point in the manner of a well known television presentation. Further data, such as take-off point, course destination, altitude, etc., may likewise be reproduced as letters, numbers, or pictures, in addition to the identification. FIGURE 4 shows the altitude in hectometers below the characteristic data. As far as information is concerned which is related to the vehicle and which only the vehicle can give, this information can be transmitted to the receiver after the synchronizing signal which was transmitted by the vehicle.

An example of such transmission signal with additional information as obtained during its time cycle in the receiver is illustrated in FIGURE 5. In this case, it is assumed that the intelligence is transmitted in the form of coded pulses. In order to reduce disturbances which may occur when a disturbing pulse triggers a distance measurement, it is recommended to transmit several, rather than a single, time measuring pulses, said pulses being transmitted in a certain time sequence. If a disturbing pulse in the receiver should occur during this pulse group or series, the receiver would recognize the signal as incorrect and would not further transmit the same. In the embodiment of FIGURE 5, it is assumed that a group of two pulses 1 and 2 is used. Then, code pulse groups or series 3, 4 and 5 follow which give other characteristic data, such as altitude, velocity, etc. With respect to time, further intelligence may be added as far as possible, if necessary by other modulation. The staggering with respect to time of the transmitting time of the vehicles should amount, in this case, to ten milliseconds. As shown in FIGURE 5, the transmitting signal is terminated long before the instant at which, according to the program, the next subsequent transmitting vehicle starts to transmit.

In the inventive system, it is desirable to estimate the arrival of a vehicle at a certain location, such as an airport. Therefore, another computing device R' with an indicator I will be provided in accordance with a further development of the present invention to calculate the time of arrival to be expected. The computing device calculates from the location indications the data required for calculating the arrival time, said data being the course and velocity of the vehicle.

If the capacity of the system is to be enlarged still further, i.e., if for instance in the abovementioned example more than 1,000 vehicles, or even 2,000 vehicles are to be supervised, then the system as described in the foregoing has to be doubled, or tripled, etc., i.e., in place of a single receiver, several receivers, for example two, tuned to different frequencies are to be provided. The vehicles are divided into groups transmitting on different frequencies. A single time standard is necessary for several receivers which are parallel to one another and a single computing device is necessary for the central station because, if storage means are provided, it is possible to calculate the location of two or more vehicles one after the other, said vehicles transmitting simultaneously at different frequencies.

In order to provide a supervision over a larger range or area, for example, over an entire country, the locations and the characteristic data can be transmitted to a main central station and can be reproduced in said main station in a main location-plan indicating device.

Figure 6:
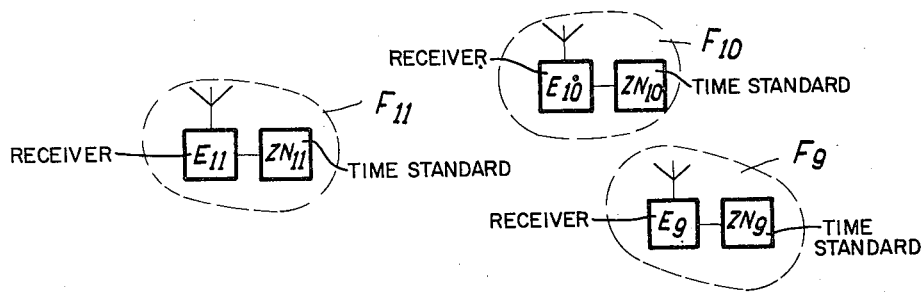
FIGURE 6 is a block diagram of a further embodiment of the invention, similar to that shown in FIGURE 1, but wherein the vehicles receive and the central station transmits.
Figure 6:
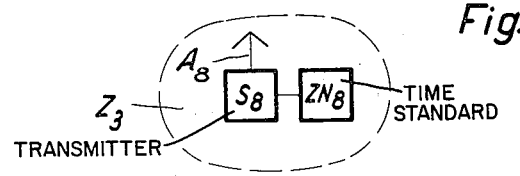

The system described with reference to FIGURE 1 can be reversed in such a manner, that the stationary apparatus transmits and the vehicles receive. An example for such system is illustrated in FIGURE 6. A transmitter $S_8$ having a transmitting antenna $A_8$ and a time standard $ZN_8$ is provided in the central station $Z_3$. Receivers $E_9$, $E_{10}$, $E_{11}$ are provided in the vehicles $F_9$, $F_{10}$, $F_{11}$, respectively, said receivers being tuned to the same frequency as the transmitter $S_8$. A time standard $ZN_9$, $ZN_{10}$, $ZN_{11}$ is also provided in the vehicles $F_9$, $F_{10}$, $F_{11}$, respectively. The time standard $ZN_8$ in the central station $Z_3$ serves to transmit signals to the individual vehicles $F_9$, $F_{10}$, $F_{11}$ according to a time-slot program, while the time standards $ZN_9$, $ZN_{10}$, $ZN_{11}$ in these vehicles energize the receivers only during such times as are assigned to receiving times for the individual vehicles. It is also possible to combine this system with systems described in the foregoing in which the vehicles transmit and the central station receives. Such combination is recommended to transmit intelligence from the central station to a certain vehicle, whereby the intelligence may be by speech or picture, for example, a location-plan indication.

Figure 7:
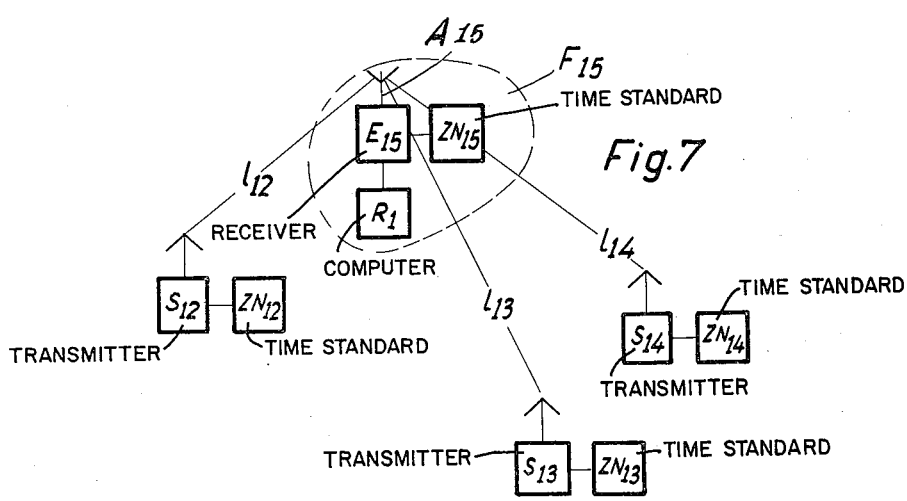
FIGURE 7 is a block diagram of another embodiment of the invention, similar to that shown in FIGURE 4, but wherein the vehicles receive and the central station transmits.

The above described system of ascertaining the location of the vehicles in a central station can be reversed in such a manner that, in place of a transmitter, a receiver is used, and in place of a receiver, a transmitter is used. A system which is a reversal of the system described with reference to FIGURE 4 is illustrated in FIGURE 7. In this embodiment, the stationary apparatus comprises three transmitters $S_{12}$, $S_{13}$ and $S_{14}$, associated with time standards $ZN_{12}$, $ZN_{13}$, $ZN_{14}$, respectively. Instead of three transmitters, any number of transmitters may be provided. Reference character $F_{15}$ denotes a vehicle having a receiver $E_{15}$, including a receiving antenna $A_{15}$, a time standard $ZN_{15}$, and a computer $R_1$.

Figure 8:
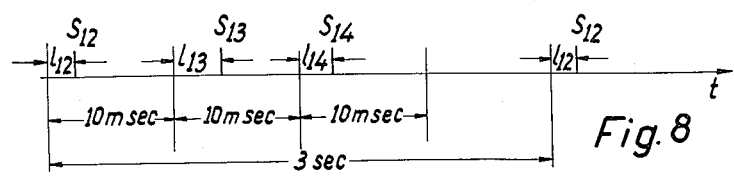
FIGURE 8 is a graphical diagram showing the pulses appearing at the receiver of one of the vehicles shown in FIGURE 7.

FIGURE 8 shows an example of a diagram of pulses appearing at the input of the receiver $E_{15}$, FIGURE 7, whereby the transmitters $S_{12}$, $S_{13}$ and $S_{14}$, are transmitting signals $s_{12}$, $s_{13}$, $s_{14}$, respectively, staggered according to a time-slot program and controlled by the respective time standards. It is assumed that the time interval between the transmitting time-slots of the individual transmitters $S_{12}$, $S_{13}$, $S_{14}$ is 10 milliseconds. The distances $L_{12}$, $L_{13}$, $L_{14}$ to the transmitters $S_{12}$, $S_{13}$, $S_{14}$, respectively, are ascertained in the receiver $E_{15}$ by means of the reference times derived from the time standard $ZN_{15}$. The location of the vehicle $F_{15}$ is then ascertained in a computing device $R_1$ and is indicated at the output of this computing device. The location can be ascertained from the times at which the signals are received from the transmitter to which transmitter group the location belongs. It is possible to tune other transmitter groups to the same frequency as the transmitter group $S_{12}$, $S_{13}$, $S_{14}$, whereby other transmitting times are assigned to these other groups. In the example of FIGURE 8, it is assumed that each of the transmitters transmits within a time interval of three seconds. Thus, three seconds after transmitting of the signal $s_{12}$, this signal is again transmitted. Since a transmitting group which, in the example given, comprises three transmitters, covers a time of $3 \times 10 = 30$ milliseconds, in case of a repetition cycle of three seconds $$100\left(\frac{3,000 \text{ milliseconds}}{30 \text{ milliseconds}}=100\right)$$

transmitting groups with three transmitters each can be applied to this single frequency. Also, the system described with reference to FIGURES 7 and 8 can be combined with the aforementioned system in which the vehicles transmit and the central station receives.

It is a particular advantage of the system according to the present invention that no considerable equipment changes are necessary to introduce it into the vehicles. Each vehicle needs only one time standard and the radio communication sets which are already present, for example, in airplanes, can be retained and used. The transit times already present in these sets can be tuned by additional phasing members to a predetermined magnitude which is common to all of the sets in the vehicles.

I claim:

1. A system for continuous supervision including identifying a plurality of vehicles from a central station comprising, a transmitter in each vehicle, a receiver at the central station, said transmitters and receivers being tuned to a common frequency; a precision time standard in each vehicle and at the central station, said time standards being synchronized to the same cyclicly repeating time base arbitrarily divided into a plurality of time-slots each corresponding with a selected vehicle; trigger means in each vehicle controlled by the time standard and initiating transmissions from the vehicle at the beginnings of the time-slots assigned thereto, the duration of each time-slot being greater than the transit time of each transmission to the central station; and analyzing and indicating means at the receiver for presenting the received transmissions and identifying each according to the time-slot assigned thereto.

2. In a system according to claim 1, transit time measuring means at the receiver for determining the distance of a vehicle from the station by measuring the elapsed time between the start of the time-slot assigned to the vehicle and the instant of reception of its transmission.

3. In a system as claimed in claim 1, transmitter signal coding means in each vehicle for encoding each transmission into the form of several pulses spaced according to a certain time sequence to distinguish the transmissions from spurious signals.

4. In a system as claimed in claim 1, the addition of at least two other receiver stations spaced in fixed relation to said central station and tuned to receive the vehicle transmissions; and computer means connected with all of the receivers and having transit-time measuring means for determining the distances of a vehicle from each receiver by measuring the elapsed time between the start of the time-slot assigned to the vehicle and the instants of reception of its transmission, said computer delivering outputs locating the vehicle in a standard coordinate system.

5. In a system as claimed in claim 4, a plan indicator area defined by said coordinate system; and marker means for displaying a dot at the computed location of each vehicle.

6. In a system as claimed in claim 5, said indicator comprising a raster of lines, and said computer outputs identifying the location of the dot by indicating the line number and the distance along the line from its origin.

7. In a system as claimed in claim 5, said indicator comprising an arrangement of spaced picture points and said computer identifying one picture point by selecting an indicia assigned thereto.

8. In a system according to claim 5, the locations of a plurality of vehicles being displayed when received on said indicator area, and said indicator having a long-persistency screen whereby the course and velocities of the vehicles can be estimated.

9. In a system according to claim 1, data storage means having indicia identifying the vehicles and located at the central station, said storage means being connected to the time standard and controlled thereby to display indicia identifying each vehicle during its time-slot.

10. In a system according to claim 1, modulation means in each vehicle for applying to its transmissions signals having intelligence increasing the information at the central station concerning the particular vehicle.

11. In a system as claimed in claim 10, means at the central station for displaying said intelligence at the indicating means.

12. In a system as claimed in claim 1, said time standards comprising quartz crystal oscillators.

13. In a system as claimed in claim 1, a further computer at said central station and determining arrival times of approaching vehicles.

14. Two systems as claimed in claim 1, each system employing the same time standard but different frequencies; and received transmission storing means for retaining signals simultaneously received and displaying them successively on said indicating means.

15. In a system as claimed in claim 1, a receiver in each vehicle; a transmitter at the central station and tuned to the same frequency as said vehicle receivers; trigger means at the central station for energizing the central station transmitter at a predetermined instant in each time-slot; and energizing means in each vehicle controlled by its time standard and energizing the receiver during said time-slot.

16. In a system according to claim 15, at least two other transmitters associated with the central station and fixed in spaced relation with respect thereto; triggering means controlled by said time standard to transmit signals on the same frequency but at different times; and computer means in each vehicle for ascertaining its own location by computing the elapsed times between transmissions of the signals and their receptions in the vehicle.

17. A system for continuous supervision of a plurality of vehicles with respect to a central station comprising, a receiver in each vehicle; a transmitter at the central station, said transmitter and receivers being tuned to a common frequency; a precision time standard in each vehicle and at the central station, said time standards being synchronized to the same cyclicly repeating time base arbitrarily divided into a plurality of time-slots each corresponding with a selected vehicle; trigger means at the central station for energizing the transmitter at the beginning of each time slot; and energizing means in each vehicle controlled by its time standard and energizing the receiver during the time slot assigned thereto.

18. In a system according to claim 17, at least two other transmitters associated with the central station and fixed in spaced relation thereto; trigger means controlled by said time standard to transmit signals on the same frequency but at different times; and computer means in each vehicle for ascertaining its own location by computing the elapsed times between transmission of the signals and their receptions in the vehicle.

References Cited in the file of this patent

UNITED STATES PATENTS

| | | |
|---|---|---|
| 761,256 | Salisbury | May 31, 1904 |
| 1,495,616 | Simpson | May 27, 1924 |
| 1,742,902 | Deloraine et al. | Jan. 7, 1930 |
| 2,406,165 | Schroeder | Aug. 20, 1946 |
| 2,534,842 | Wallace | Dec. 19, 1950 |
| 2,838,753 | O'Brien et al. | June 10, 1958 |
| 2,843,846 | Hawkins | July 15, 1958 |
| 2,919,303 | Luck | Dec. 29, 1959 |
| 2,944,254 | Kerr | July 5, 1960 |

OTHER REFERENCES

Precise Atomic Navigation Unit Developed, Aviation Week, Oct. 22, 1956, pp. 103–107 (p. 103 relied on).